July 3, 1923.
H. C. ELLIS
TILTING TRAP
Filed March 23, 1921
1,460,411
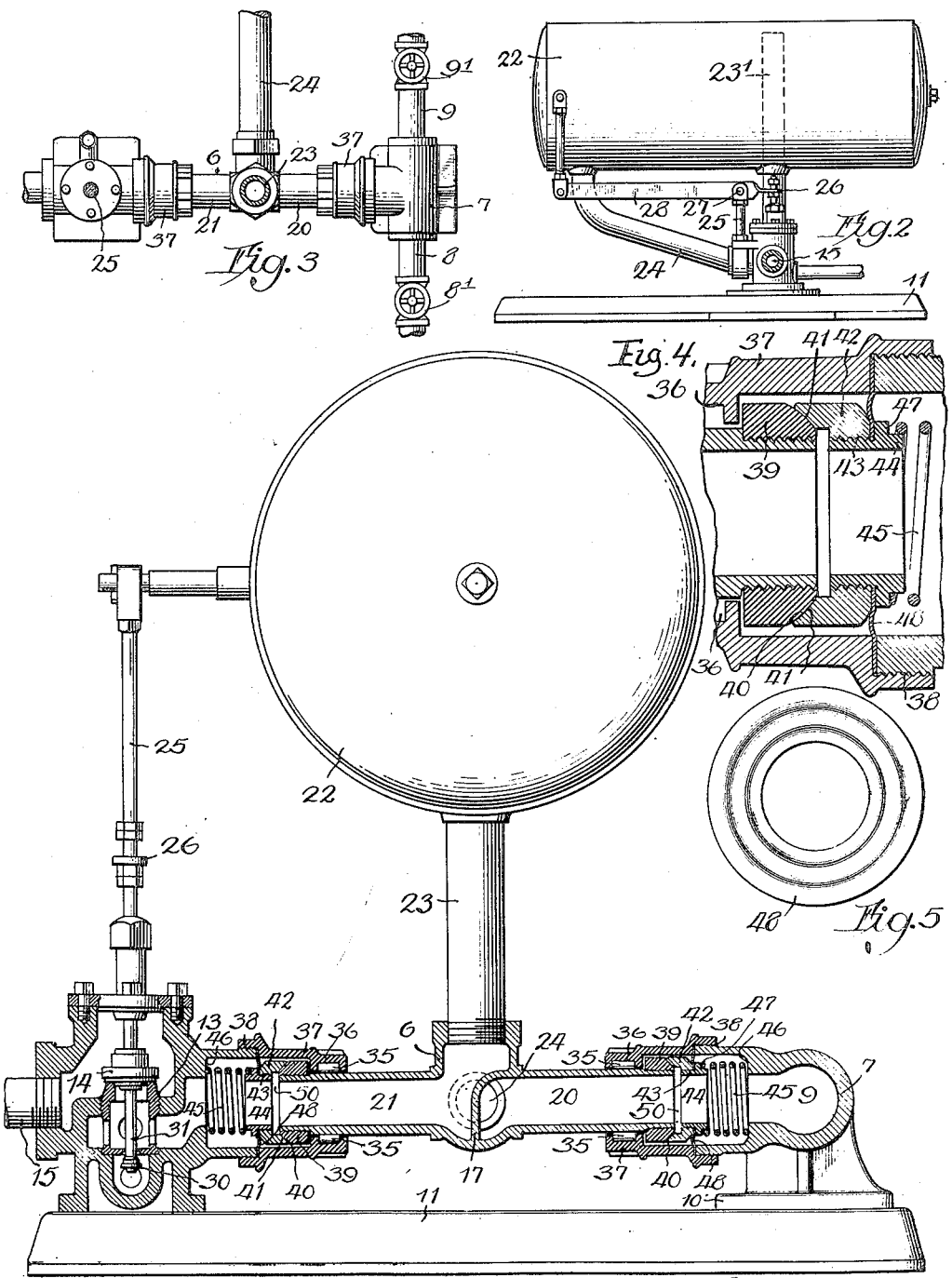

Patented July 3, 1923.

1,460,411

UNITED STATES PATENT OFFICE.

HUBERT C. ELLIS, OF EVANSTON, ILLINOIS, ASSIGNOR TO ELLIS DRIER & ELEVATOR COMPANY, OF CHICAGO, ILLINOIS, A CORPORATION OF WISCONSIN.

TILTING TRAP.

Application filed March 23, 1921. Serial No. 454,823.

*To all whom it may concern:*

Be it known that I, HUBERT C. ELLIS, a subject of the King of Great Britain, and a resident of Evanston, in the county of Cook and State of Illinois, have invented certain new and useful Improvements in Tilting Traps, of which the following is a full, clear, and exact description.

The invention relates to tilting traps and its object is to provide a construction in which the trunnion pipe for the drum is supported so as to effectively prevent leakage of steam and so as to overcome varying frictional resistance resulting from expansion and contraction of the pipe.

The invention consists in the several novel features hereinafter set forth and more particularly defined by claims at the conclusion hereof.

In the drawings: Fig. 1 is a transverse section of a condenser trap embodying the invention. Fig. 2 is a side elevation. Fig. 3 is a horizontal section taken on line 3—3 of Fig. 1. Fig. 4 is a section of one of the joints for the trunnion pipe upon a larger scale. Fig. 5 is a detail of the diaphragm in the joint.

The invention is exemplified in a trap comprising a trunnion-pipe 6, one end of which is in communication with a stationary fitting 7, to which the inlet-pipe 8 and the outlet pipe 9 for the condensate are connected. Fitting 7 is usually provided with a bottom flange 10 which is bolted to a base 11. The other end of the trunnion-pipe is in communication with a valve-casing 13 containing a steam cut-off 14 for controlling the delivery of live steam to discharge the condensate from the drum. A pipe 15 is connected to the casing 13 to supply live steam thereto so that when the cut-off 1 is opened, steam will pass into one end of the trunnion pipe. A wall 17 divides the space in the trunnion pipe so as to form therein a duct 20 for the condensate and a steam duct 21. A drum 22 is supported from the trunnion-pipe by a riser pipe 23 and an elbow pipe 24. Elbow pipe 24 conducts condensate from the duct 20 in the trunnion-pipe into and from the drum. Riser-pipe 23 conducts live-steam from the duct 21 in the trunnion pipe to the top of the drum which is provided with extension pipe 23' for this purpose. The stem 25 of the admission valve 14 is operatively connected to a lever 26 which is pivoted on a stationary fulcrum 27 and is connected by a link 28 to the drum 22 so that when the drum is tilted and lowered by a column of condensate therein, lever 26 will operate stem 25 to open valve 14 and supply live steam from pipe 15 to the drum through valve-casing 13, duct 21 and pipes 23, 23' to the space above the condensate and thus force it through elbow-pipe 24, duct 20, and into discharge pipe 9, it being understood that pipes 8 and 9 are provided with check-valves 8' and 9' to prevent back-flow of the condensate. A valve 30 is connected to valve 14 by a stem 31 to provide a vent while the condensate is being delivered into the drum. This relief-valve 30 will be closed when the steam-admission valve 14 is open and vice versa. A suitable counterweight 50 is usually provided to provide for the return of the drum to its normal position after the condensate has been discharged therefrom.

In the operation of condenser traps, great difficulty has been experienced in preventing leakage between the trunnion-pipe and the stationary fittings for the condensate and live steam. Packing boxes have been found to be unsatisfactory, because, when the packing was kept tight, the friction upon the pipe was so great as to interfere with the free operation or tilting of the drum responsively to a predetermined accumulation of condensate. In other cases, leakage resulted from the expansion and contraction of the trunnion-pipe resulting from changes in temperature. The primary object of the present invention is to provide a trap in which the trunnion-pipe, whereby the drum is supported, will be supported so that there will be no leakage of fluid and so that there will be no substantial variation in the frictional resistance applied to the trunnion-pipe. In attaining this object, both ends of the trunnion-pipe are similarly supported and connected, so that a description of one connection and support will suffice for both.

Each end of the trunnion-pipe 6 is supported by anti-friction rollers 35 which are carried in a groove 36 formed in a sleeve 37 which is secured by a screw-thread 38 to the adjacent fitting. A bearing-ring 39 is screw-threaded to the end of the trunnion-pipe outwardly of the roller-bearing and this ring is provided with a tapered bearing face 40 which is adapted to fit snugly against and form a tight joint with a correspondingly shaped face 41 on a stationary bearing-ring 42. These faces 40 and 41 are accurately ground to form a true fit. Ring 42 is connected by a screw-thread 43 to a collar 44. A coil spring 45 interposed between a shoulder 46 on adjacent fitting and a shoulder 47 on collar 44 serves to yieldingly press the bearing-ring 42 against the bearing-ring 39 on the trunnion-pipe. A diaphragm 48, usually of copper, has its outer margin clamped between the sleeve 37 and the end of the adjacent fitting and its inner margin clamped between bearing-ring 42 and shoulder 47 on the collar 44. This diaphragm forms a connection for the bearing-ring 42 and its collar 44 which prevent leakage of steam between the bearing-ring 42 and the fitting and which permits movement of ring 42 with, and responsively to, any contraction or expansion of the ring 39. The diaphragm is nearly flat but sufficiently flexible to permit the bearing-ring 42 to be retained against the trunnion-pipe 6. That face of the diaphragm which is adjacent the fitting is exposed to steam or fluid pressure in the trunnion-pipe and this pressure is cumulative to that exerted by the spring 45 to hold the bearing-rings in contact. In order to avoid excessive pressure or friction between the bearing-ring from fluid-pressure against the diaphragm, a space or groove 50 is formed between the contiguous end of bearing-rings and the trunnion-pipe and collar 44. By varying the depth of this groove or opening, the steam pressure on the diaphragm may be balanced sufficiently to avoid excessive friction between the bearing-rings.

The invention exemplifies a pivotal connection for the trunnion-pipe and a steam trap, in which packings are dispensed with and in which the stationary and rotatable bearing-rings are normally held together by fluid pressure; in which the pressure between the rings is automatically increased as the pressure of fluid in the pipe increases; which effectively prevents leakage; and which will operate without excessive frictional resistance between the bearing rings, as a result of expansion and contraction.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination of a trunnion pipe, fittings to which the ends of the trunnion-pipe are connected and pivotal connections between the fittings and the trunnion-pipe, one of which connections comprises a bearing-ring fixed to the trunnion-pipe, a non-rotatable bearing-ring, and a flexible diaphragm between the non-rotatable ring and one of the fittings having one of its faces in communication with and exposed to the pressure of the fluid in the pipe so that preponderating pressure will be applied to the diaphragm in that direction which will cause it to hold the rings in contact.

2. The combination of a trunnion-pipe, fittings to which the ends of the trunnion pipe are connected and pivotal connections between the fittings and the trunnion pipe, one of which connections comprises a bearing-ring fixed to the trunnion-pipe, a non-rotatable bearing-ring, a spring for holding the rings in contact, and a flexible diaphragm between the non-rotatable ring and one of the fittings having one of its faces in communication with and exposed to the pressure of the fluid in the pipe so that preponderating pressure will be applied to the diaphragm in that direction which will cause it to hold the rings in contact.

3. The combination of a trunnion-pipe, fittings to which the ends of the trunnion pipe are connected and pivotal connections between the fittings and the trunnion-pipe, one of which connections comprises a bearing-ring fixed to the trunnion-pipe, a non-rotatable bearing-ring, a spring for holding the rings in contact, a flexible diaphragm between the non-rotatable ring and one of the fittings, and an anti-friction bearing for the pipe disposed inwardly of the bearing-rings.

4. The combination of a trunnion-pipe, fittings to which the ends of the trunnion-pipe are connected and pivotal connections between the fittings and the trunnion-pipe, one of which connections comprises a bearing-ring fixed to the trunnion-pipe, a non-rotatable bearing-ring, a flexible diaphragm between the non-rotatable ring and one of the fittings and a spring beyond the end of the trunnion-pipe and between the fitting and the non-rotatable bearing-ring.

5. The combination of a trunnion-pipe, fittings to which the ends of the trunnion-pipe are connected, and pivotal connections between the fittings and the trunnion pipe, one of which connections comprises a bearing-ring fixed to the trunnion-pipe, a non-rotatable bearing ring, a flexible diaphragm between the non-rotatable ring and one of the fittings, a sleeve removably secured to the fitting and an anti-friction bearing for the trunnion pipe carried by said sleeve.

6. The combination of a trunnion pipe, fittings to which the ends of the trunnion pipe are connected and pivotal connections between the fittings and the trunnion-pipe, one of which connections comprises a bearing-ring fixed to the trunnion-pipe, a non-rotatable bearing ring, a flexible diaphragm between the non-rotatable ring and one of the fittings, a sleeve removably secured to the fitting and an anti-friction bearing for the trunnion-pipe carried by the outer end of said sleeve.

7. The combination of a trunnion pipe, fittings to which the ends of the trunnion pipe are connected and pivotal connections between the fittings and the trunnion pipe, one of which connections comprises a bearing-ring fixed to the trunnion-pipe, a non-rotatable bearing-ring, a flexible diaphragm between the non-rotatable ring and one of the fittings, a collar screw-threaded to and extending inside of the non-rotatable bearing ring for clamping the inner margin of the bearing-ring, and a sleeve extended to enclose the bearing-rings and removably secured to said latter fitting, the outer margin of the diaphragm being clamped against said fitting by said sleeve.

8. The combination of a trunnion-pipe, fittings to which the ends of the trunnion-pipe are connected and pivotal connections between the fittings and the trunnion-pipe, one of which connections comprises a bearing-ring fixed to the trunnion pipe, a non-rotatable bearing-ring, a flexible diaphragm between the non-rotatable ring and one of the fittings, a collar screw-threaded to the non-rotatable bearing ring for clamping the inner margin of the bearing ring, a sleeve extended to enclose the bearing-rings and removably secured to said latter fitting, the outer margin of the diaphragm being clamped against said fitting by said sleeve, and an outer anti-friction bearing for the pipe in the outer end of said sleeve.

HUBERT C. ELLIS.